United States Patent

Hayakawa et al.

(10) Patent No.: US 7,674,518 B2
(45) Date of Patent: Mar. 9, 2010

(54) POLYVINYL ALCOHOL FILM AND POLARIZING FILM AND POLARIZING PLATE USING THE SAME

(75) Inventors: Seiichirou Hayakawa, Osaka (JP); Syuichi Kitamura, Osaka (JP); Yukari Nishimoto, Osaka (JP); Akihiko Chigami, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 18 days.

(21) Appl. No.: 11/794,398

(22) PCT Filed: Dec. 19, 2005

(86) PCT No.: PCT/JP2005/023237

§ 371 (c)(1),
(2), (4) Date: Jun. 27, 2007

(87) PCT Pub. No.: WO2006/070626

PCT Pub. Date: Jul. 6, 2006

(65) Prior Publication Data

US 2007/0295945 A1    Dec. 27, 2007

(30) Foreign Application Priority Data

Dec. 28, 2004    (JP)    ............................ 2004-381184

(51) Int. Cl.
  *B32B 7/00*    (2006.01)
  *G02B 5/30*    (2006.01)

(52) U.S. Cl. ........................ 428/212; 428/220; 428/333; 428/395; 428/474.4; 252/585

(58) Field of Classification Search ................. 428/212, 428/220, 333, 395, 474.4; 252/585
See application file for complete search history.

(56) References Cited

U.S. PATENT DOCUMENTS

| 6,924,258 B2 * | 8/2005 | Delamarche et al. ......... 510/296 |
| 2007/0298234 A1 * | 12/2007 | Oono et al. ................. 428/220 |
| 2008/0113173 A1 * | 5/2008 | Hayakawa et al. .......... 428/220 |

FOREIGN PATENT DOCUMENTS

| JP | 2001-316492 | 11/2001 |
| JP | 2002-144406 | 5/2002 |
| JP | 2002-146139 | 5/2002 |
| JP | 2002-166437 | 6/2002 |
| JP | 2004-20631 | 1/2004 |

OTHER PUBLICATIONS

Fujita Satoshi, JP 2002-166437 machine translation, Jun. 11, 2002.*

* cited by examiner

*Primary Examiner*—David R Sample
*Assistant Examiner*—Lawrence D Ferguson
(74) *Attorney, Agent, or Firm*—Hamre, Schumann, Mueller & Larson, P.C.

(57) ABSTRACT

The present invention provides a polyvinyl alcohol film having a correlation length of 200 nm or less, the correlation length being derived from the result of light scattering measurement using a He—Ne laser having a wavelength of 633 nm as a light source.

10 Claims, 1 Drawing Sheet

POLYVINYL ALCOHOL FILM AND POLARIZING FILM AND POLARIZING PLATE USING THE SAME

TECHNICAL FIELD

The present invention relates to a polyvinyl alcohol film exhibiting reduced light scattering. More specifically, the invention relates to a polyvinyl alcohol film capable of being used as a raw film at the production of a polarizing film, which is excellent in film-forming ability, has no optical defect, and is excellent in light transmittance.

BACKGROUND ART

Hitherto, a polyvinyl alcohol film has been produced by dissolving a polyvinyl alcohol resin in a solvent such as water to prepare a stock solution, subsequently forming a film by a solution-casting method (hereinafter, referred to as a casting method), and drying the film using a metal heating roll or the like. The polyvinyl alcohol film thus obtained has been utilized in a large number of applications as a film excellent in transparency and dyeing property, and a polarizing film is cited as one of useful applications thereof. Such a polarizing film has been used as an elemental constituent element of liquid crystal displays and in recent years, its use has been extended to equipments for which high definition and high reliability are required.

Under such circumstances, as the screen size of a liquid crystal television set or the like is enlarged, there has been desired a polarizing film having smaller number of optical defects as compared with conventional ones. As measures therefor, it have been proposed to use a polyvinyl alcohol film containing optical foreign particles having a size of 5 μm or more in an amount of 500 or less particles per 100 cm$^2$ (for example, see Patent Document 1) or to use a polyvinyl alcohol film containing optical foreign particles having a size of 20 μm or more present on the surface of the film in an amount of 10 or less particles per 1 m$^2$ (for example, see Patent Document 2).

However, causes of the optical defects are not only micron-order foreign particles and not only the foreign particles on the film surface. Submicron-order foreign particles, aggregates of additives, or inhomogeneous regions derived from polymer structures present inside the film are also causes of the optical defects. This is because the polarized light used in a liquid crystal may reflect or interfere in visible light regions, i.e., submicron-size minute regions having a submicron wavelength (generally 370 to 700 nm) and having a refractive index different from that of polyvinyl alcohol resin. In the case where the polarized light reflects or interferes, transmittance of the polarized light is disturbed and thus a light scattering phenomenon may occur.

Usually, for the purpose of mainly improving the film-forming ability, various additives such as a plasticizer and a surfactant are mixed into a polyvinyl alcohol film. Among these additives, there are some additives which form aggregates having a size of several hundred nm during the process of film formation. The aggregates formed in the film have a refractive index different from that of the polyvinyl alcohol film and hence may be a cause of light scattering. Herein, the aggregates may include aggregates formed by various mechanisms, such as those formed by electrostatic aggregation of the additives themselves, those formed by aggregation of subcomponents of the additives, or those formed by aggregation of decomposition products of the additives formed by heat during the film formation. When the aggregates are as minute as about several tens nm and are homogeneously dispersed in the film, light scattering may not occur. However, since plurality of additives are usually used sometimes in an extremely minute amount (ppm order) in the polyvinyl alcohol film, it has been hitherto difficult to specify causes of light scattering.

Since light scattering remarkably decreases fineness of images, in consideration of fineness enhancement, luminance enhancement, and area enlargement required for recent displays, it has been desired to develop a technology for further improving the light scattering through specifying causes of the light scattering.

Patent Document 1: JP-A-2001-316492

Patent Document 2: JP-A-2004-20631

DISCLOSURE OF THE INVENTION

Problems that the Invention is to Solve

An object of the invention is to provide a polyvinyl alcohol film capable of meeting fineness enhancement, luminance enhancement, and area enlargement of liquid crystal displays, which is used as a raw film for the production of a polarizing film excellent in film-forming ability, exhibiting less light scattering, and excellent in light transmittance.

Means for Solving the Problems

As a result of the extensive studies for solving the above problems, the present inventors have found that the above object can be achieved by the polyvinyl alcohol film shown in the following and thus they have accomplished the invention. Namely, the object of the invention has been achieved by the following.

(1) A polyvinyl alcohol film, wherein a correlation length derived from the result of light scattering measurement using a He—Ne laser having a wavelength of 633 nm as a light source is 200 nm or less.

(2) The polyvinyl alcohol film according to the item (1), wherein content of fatty acids having 10 or more carbon atoms is from 1 to 100 ppm.

(3) The polyvinyl alcohol film according to the item (2), wherein content of fatty acids having 14 or more carbon atoms is from 0.1 to 40% by weight relative to content of fatty acids having 10 or more carbon atoms.

(4) The polyvinyl alcohol film according to the item (2), wherein the fatty acids having 10 or more carbon atoms include lauric acid.

(5) The polyvinyl alcohol film according to the item (2), which contains a surfactant containing a fatty acid having 10 or more carbon atoms in an amount of 1 to 10% by weight.

(6) The polyvinyl alcohol film according to the item (1), which contains a polyvinyl alcohol resin having a weight-average molecular weight of 140,000 to 260,000.

(7) The polyvinyl alcohol film according to the item (1), whose film thickness is from 30 to 70 μm.

(8) The polyvinyl alcohol film according to the item (1), whose film width is 3 m or more.

(9) The polyvinyl alcohol film according to the item (1), whose film length is 4000 m or more.

(10) The polyvinyl alcohol film according to the item (1), which is used as a raw film of a polarizing film.

(11) A polarizing film formed of the polyvinyl alcohol film according to the item (1).

(12) A polarizing plate comprising the polarizing film according to the item (11) and a protective film provided on at least one surface of the above polarizing film.

Advantage of the Invention

The correlation length of the polyvinyl alcohol film of the invention, which is derived from the result of light scattering measurement using a He—Ne laser having a wavelength of 633 nm as a light source, is 200 nm or less. Accordingly, the influence of light scattering materials in the film on a light in a visual light region is small. Therefore, it becomes possible to obtain a polarizing film excellent in light transmittance by the use of the polyvinyl alcohol film of the invention.

BEST MODE FOR CARRYING OUT THE INVENTION

Figure 1:
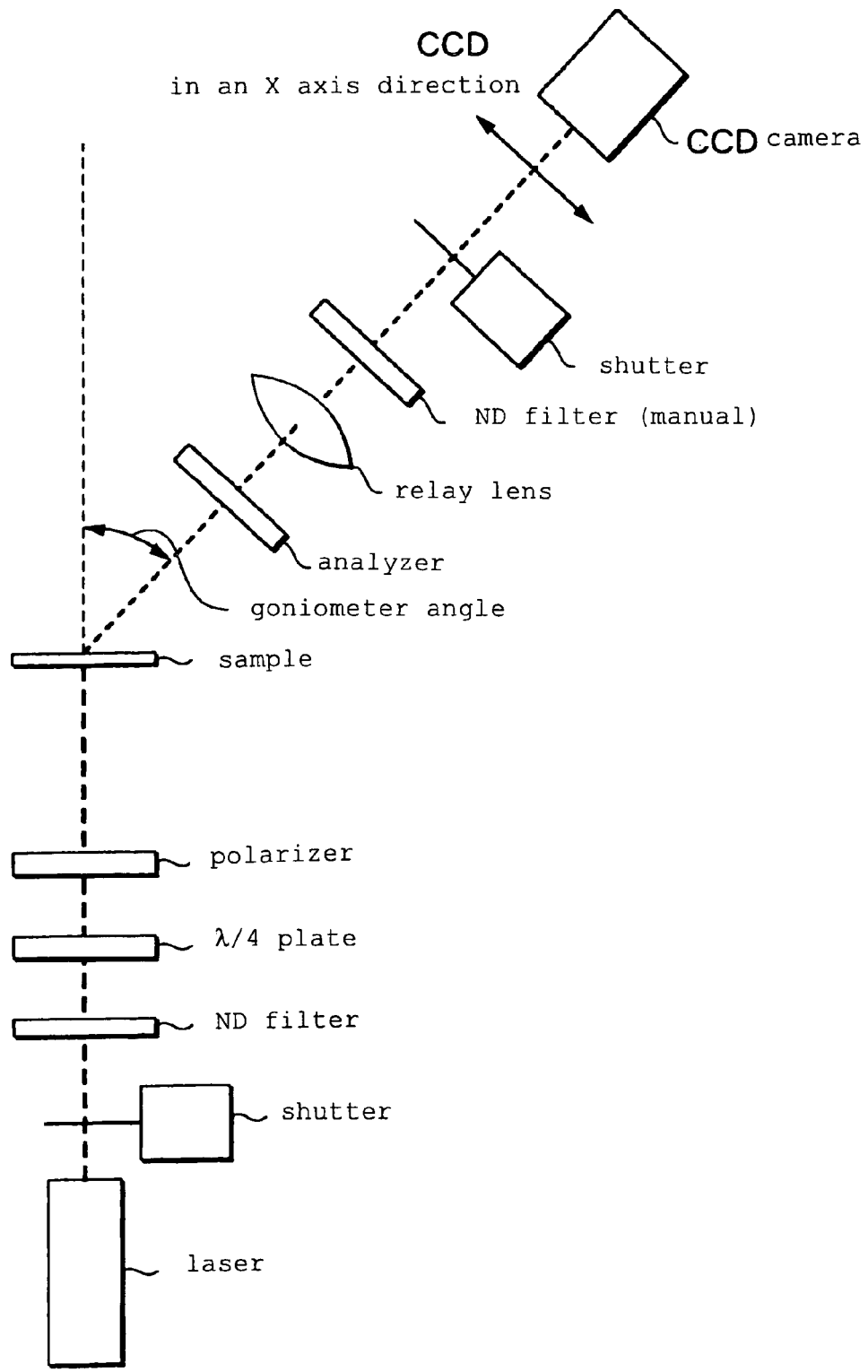
FIG. 1 is a schematic view of the light scattering measuring apparatus used in Examples of the invention.

The invention relates to a polyvinyl alcohol film wherein a correlation length derived from the result of light scattering measurement using a He—Ne laser having a wavelength of 633 nm as a light source is 200 nm or less.

The correlation length of the polyvinyl alcohol film of the invention is 200 nm or less, preferably 180 nm or less, more preferably 150 nm or less. In this connection, an upper limit of the correlation length is preferably 100 nm. When the correlation length of the polyvinyl alcohol film exceeds 200 nm, the influence of light scattering materials on a light in a visual light region increases and hence, in consideration of the demand for high luminance in future liquid crystal display devices, the light transmittance of the polarizing film obtained by the use of the polyvinyl alcohol film is insufficient.

In general, the size of light scattering materials can be determined from the results of measuring light scattering using a laser. In the invention, the size of the light scattering materials contained in the film is evaluated by the correlation length of the film. The correlation length in the invention refers to one determined by the following method.

Namely, using a He—Ne laser (wavelength 633 nm), Hv scattering measurement was performed on the polyvinyl alcohol film wherein a polarizer and an analyzer are utilized (Reference Document: Kobunshi no Kozo (2) Sanran Jikken to Keitai Kansatsu). Then, utilizing the resulting data of scattered light intensity, the correlation length t is derived using Debye-Bueche expression (Reference Document: P. Debye and A. M. Bueche, J. Appl. Phys., 20, 518 (1949); M. Shibayama, Macromol. Chem. Phys., 199, 1 (1998)). The correlation length $\xi$ corresponds the size of the light scattering material. In this connection, the above scattered light intensity is measured at least in the region where a scattering angle in the air is from 22.5° to 54.8°.

The polyvinyl alcohol film of the invention is obtained by forming a film of a polyvinyl alcohol resin but a production process thereof is not particularly limited. For example, the film can be produced by preparing an aqueous polyvinyl alcohol resin solution and casting the aqueous solution onto a drum roll or an endless belt, preferably a drum roll to form a film. The following will describe a representative process for producing the polyvinyl alcohol film of the invention.

As a polyvinyl alcohol resin for use in the polyvinyl alcohol film, there is usually employed a resin obtained by saponifying polyvinyl acetate derived from polymerization of vinyl acetate. However, in the polyvinyl alcohol film of the invention, the resin is not necessarily limited thereto and there may be also used resins obtained by saponifying copolymers of vinyl acetate with a small amount of a component copolymerizable with vinyl acetate, such as an unsaturated carboxylic acid (inclusive of a salt, an ester, an amide or a nitrile); an olefin having 2 to 30 carbon atoms (ethylene, propylene, n-butene, isobutene, etc.); a vinyl ether; an unsaturated sulfonate salt; or the like.

The weight-average molecular weight of the polyvinyl alcohol resin is not particularly limited but is preferably from 120,000 to 300,000, more preferably from 140,000 to 260,000, more preferably from 160,000 to 200,000. When the weight-average molecular weight is less than 120,000, sufficient optical performance is not obtained in the case where the polyvinyl alcohol film is used as an optical film. When the weight-average molecular weight exceeds 300,000, stretching is difficult in the case where the film is used as a polarizing film and thus industrial production is difficult. Thus, the cases are not preferred. Incidentally, in the invention, the weight-average molecular weight of the polyvinyl alcohol resin means weight-average molecular weight measured by a GPC-LALLS method.

Moreover, the saponification degree of the polyvinyl alcohol resin is preferably 97% by mol or more, more preferably from 98 to 100% by mol, further preferably from 99 to 100% by mol. When the saponification degree is less than 97% by mol, a sufficient optical performance is not obtained in the case where the polyvinyl alcohol resin is used as an optical film, so that the case is not preferred.

The polyvinyl alcohol resin usually contains sodium acetate and hence, in the case where it is used for the production of a polyvinyl alcohol film, a powder thereof is first washed in order to remove sodium acetate. At the washing, it is washed with methanol or water. In the method of washing it with methanol, recovery of the solvent is necessary. Therefore, a method of washing it with water is more preferred.

Then, a hydrous polyvinyl alcohol resin wet cake after washing is dissolved to prepare an aqueous polyvinyl alcohol resin solution. Since a desired aqueous solution having a high concentration is not obtained when such a hydrous polyvinyl alcohol resin wet cake is dissolved in water as it is, it is preferred to subject the cake to water removal once. The method of water removal is not particularly limited but a method utilizing centrifugal force is common.

By means of such washing and water removal, the water content of the hydrous polyvinyl alcohol resin wet cake is preferably controlled to 50% by weight or less, more preferably from 30 to 45% by weight. When the water content exceeds 50% by weight, it becomes difficult to control an aqueous solution to a desired concentration and thus the case is not preferred.

The hydrous polyvinyl alcohol resin wet cake after water removal is dissolved in water to prepare an aqueous polyvinyl alcohol resin solution. For the purpose of improving film-forming ability, various additives such as a surfactant and a plasticizer are added to the aqueous solution.

As the surfactant, nonionic, anionic, or cationic various surfactants can be suitably employed. The surfactant for use in the invention is preferably a surfactant containing nitrogen. Moreover, the surfactant for use in the invention is preferably a nonionic surfactant. Furthermore, it is particularly preferable to use a nonionic surfactant containing nitrogen.

As the nonionic surfactant containing nitrogen, there may be mentioned a higher fatty acid mono- or di-alkanolamide represented by the following formula:

$$RCONH-R'-OH \text{ or } RCONH-(R'-OH)_2,$$

a higher fatty acid amide represented by the following formula:

$$RCONH_2,$$

a polyoxyethylene-alkylamine represented by the formula:

$$RNH(C_2H_4O)_xH \text{ or } H(C_2H_4O)_yN(R)(C_2H_4O)_xH,$$

or the like.

In the above formulae, R is an alkyl group and has 6 to 22 carbon atoms, preferably 8 to 18 carbon atoms. R may be a single alkyl group or may be a mixture of alkyl groups having different numbers of carbon atoms. Moreover, R may be an alkyl group having an alkyl distribution derived from coconut oil, palm oil, palm kernel oil, beef tallow, or the like. Furthermore, R may be an alkenyl group. R' is any of $-C_2H_4-$, $-C_3H_6-$, or $-C_4H_8-$. Also, x and y each is an integer of 1 to 20, and x and y may be the same or different from each other.

As specific examples of the higher fatty acid alkanolamide, there may be, for example, mentioned caproic acid mono- or diethanolamide, caprylic acid mono- or or diethanolamide, capric acid mono- or diethanolamide, lauric acid mono- or diethanolamide, palmitic acid mono- or diethanolamide, stearic acid mono- or diethanolamide, oleic acid mono- or diethanolamide, coconut oil fatty acid mono- or diethanolamide, or propanolamides and butanolamides thereof instead of the ethanolamides. Of these, lauric acid diethanolamide and coconut oil fatty acid diethanolamide are suitably used.

As specific examples of the higher fatty acid amide, there may be, for example, mentioned caproic acid amide, caprylic acid amide, capric acid amide, lauric acid amide, palmitic acid amide, stearic acid amide, oleic acid amide, and the like. Of these, palmitic acid amide and stearic acid amide are advantageously used.

As specific examples of the polyoxyethylene-alkylamine, there may be mentioned polyoxyethylene-hexylamine, polyoxyethylene-heptylamine, polyoxyethylene-octylamine, polyoxyethylene-nonylamine, polyoxyethylene-decylamine, polyoxyethylene-dodecylamine, polyoxyethylene-laurylamine, polyoxyethylene-tetradecylamine, polyoxyethylene-hexadecylamine, polyoxyethylene-octadecylamine, polyoxyethylene-oleylamine, polyoxyethylene-eicosylamine, and the like. Of these, polyoxyethylene-dodecylamine and polyoxyethylene-laurylamin are advantageously used.

Moreover, as the nonionic surfactant containing nitrogen, a polyoxyethylene higher fatty acid amide or amine oxide can be also used in addition to the above-mentioned surfactants. As specific examples of the polyoxyethylene higher fatty acid amide, there may be mentioned polyoxyethylene caproic acid amide, polyoxyethylene caprylic acid amide, polyoxyethylene capric acid amide, polyoxyethylene lauric acid amide, polyoxyethylene myristic acid amide, polyoxyethylene palmitic acid amide, polyoxyethylene oleic acid amide, polyoxyethylene stearic acid amide, polyoxyethylene oleic acid amide, and the like. Of these, polyoxyethylene lauric acid amide and polyoxyethylene stearic acid amide are advantageously used. Moreover, as specific examples of the amine oxide, there may be, for example, mentioned dimethyllaurylamine oxide, dimethylstearyl oxide, dihydroxyethyllaurylamine oxide, and the like. Of these, dimethyllaurylamine oxide is advantageously used.

Total amount of the surfactant to be added is not particularly limited but is in the range of preferably 100 to 2000 ppm, more preferably 200 to 1500 ppm, further preferably 300 to 1200 ppm. When the amount of the surfactant is less than 100 ppm, it becomes difficult to peel a film from a cast drum and thus a film-forming ability is poor. On the other hand, when the amount exceeds 2000 ppm, a light scattering phenomenon occurs. Thus, the cases are not preferred.

In the step of producing the polyvinyl alcohol film of the invention, it is preferred to specify the kind and amount of fatty acids contained in the film by adjusting the kind and amount of the above surfactant to be added. In the invention, the content of fatty acids includes not only the amount of the fatty acids contained in the surfactant but also the amount of fatty acids formed as a result of decomposition of the surfactant during film formation.

Among fatty acids, a higher fatty acid has, at the terminal, a relatively long carbon chain which is hydrophobic and a carboxyl group which is hydrophilic, and thus the acid itself may be a surfactant to be used in the film formation of the polyvinyl alcohol film of the invention. Therefore, the higher fatty acid contributes to improvement of the film-forming ability together with the surfactant. However, since the acid has a carboxyl group terminal unlike a commonly used surfactant having a hydroxyl group terminal, an amid terminal, or an amine terminal, micelle-like aggregates are apt to be formed when impurities such as metal ions are present. This is a reason that a higher fatty acid is used as soap and it is considered that a similar phenomenon may occur in a water-soluble polyvinyl alcohol resin or in a solvent such as water before the film formation.

Therefore, in order to assure film-forming ability of the polyvinyl alcohol resin by the casting method and reduce light scattering effectively, it is effective to specify the amount of the higher fatty acid.

As mentioned above, the fatty acids contained in the film is derived from not only those contained in the surfactant but also those generated by decomposition of the surfactant during the film formation. However, The kind and total amount of the fatty acids contained in the surfactant to be added may serve an important measure. In the invention, the content of fatty acids having 10 or more carbon atoms contained in the surfactant is preferably from 1 to 10% by weight, particularly preferably from 2 to 8% by weight relative to the total amount of the surfactant. When the content is less than 1% by weight, the film-forming ability tends to be poor. To the contrary, when the amount exceeds 10% by weight, light scattering tends to occur.

Moreover, the fatty acids having 10 or more carbon atoms preferably include lauric acid.

Furthermore, since the fatty acids having 10 or more carbon atoms are apt to be aggregated during the film-forming step of the polyvinyl alcohol film, the content of the fatty acids having 10 or more carbon atoms present in the film is preferably from 1 to 100 ppm. In this case, both performances of the film-forming ability and low light scattering are both achieved. In addition, the content of the fatty acids having 10 or more carbon atoms is preferably from 1 to 60 ppm, more preferably from 1 to 30 ppm. When the content of the fatty acids having 10 or more carbon atoms is less than 1 ppm, the film-forming ability is poor. When the content exceeds 100 ppm, light scattering tends to occur. In this connection, since higher fatty acids having 9 or less carbon atoms shows good compatibility with the polyvinyl alcohol resin, no aggregates are detected.

Incidentally, the content of the fatty acids contained in a product film is different from a value calculated from the content of fatty acids contained in the surfactant added. This is because some certain amount of the fatty acids added disappears during the film formation. For example, this is because the fatty acids are moved into a contacting part of a film-forming drum as an original surfactant or vaporized in the drying step. Although fatty acids newly formed from decomposition of the surfactant are present in the product film, the amount of the fatty acids contained in the final film is usually smaller than the amount of the fatty acids to be added before the film formation.

Many kinds of surfactants starting from oils and fats such as coconut oil, palm oil, or beef tallow are commercially available and they are used for film formation of the polyvinyl alcohol film. Among the above-mentioned surfactants, there are many surfactants which contain fatty acid(s), particularly higher fatty acid(s). Higher fatty acid(s) are contained obviously in coconut oil fatty acid ethanolamide but also in the other higher fatty acid alkanolamides, higher fatty acid amides, and polyoxyethylene higher fatty acid amides. Surfactants starting from coconut oil contain much fatty acids having 10 or more carbon atoms, such as lauric acid having 12 carbon atoms, myristic acid having 14 carbon atoms, palmitic acid having 16 carbon atoms, oleic acid having 18 carbon atoms, and stearic acid having 18 carbon atoms. Among these fatty acids, it becomes obvious that the fatty acids having 14 or more carbon atoms largely contribute to physical properties of the polyvinyl alcohol film of the invention.

Therefore, in the polyvinyl alcohol film of the invention, fatty acid(s) are preferably contained so that the content of the fatty acids having 14 or more carbon atoms becomes a specific value. The content of the fatty acid(s) varies depending on the components such as coconut oil as starting materials and the process for producing the amide, the content of the fatty acids having 14 or more carbon atoms present in the film is preferably from 0.1 to 40% by weight, more preferably from 0.5 to 30% by weight, further preferably from 0.5 to 25% by weight relative to the content of fatty acids having 10 or more carbon atoms present in the film. When the content is less than 0.1% by weight, blocking resistance of the film after film formation tends to be poor. When the content exceeds 40% by weight, light scattering may occur at the film. Thus, the cases are not preferred.

As a plasticizer to be added in the production of the polyvinyl alcohol film of the invention, a commonly used plasticizer such as glycerin, diglycerin, triglycerin, ethylene glycol, triethylene glycol, or the like can be used. The amount of the plasticizer to be added is preferably 30% by weight or less, more preferably from 3 to 25% by weight, further preferably from 5 to 20% by weight relative to the polyvinyl alcohol resin. When the amount of the plasticizer to be added exceeds 30% by weight, strength of the film is poor and hence the case is not preferred. Since these plasticizers mostly have 9 or less carbon atoms and have a relatively low molecular weight, aggregates having a size of several hundred mm hardly occur in the resin. Namely, the influence of the plasticizer on the polyvinyl alcohol film of the invention is small.

The aqueous polyvinyl alcohol resin solution containing the surfactant and plasticizer as mentioned above is obtained, for example, using a dissolution tank by charging the polyvinyl alcohol resin wet cake after water removal, water, additives such as the plasticizer and the surfactant thereinto and dissolving them under heating and stirring. With regard to the polyvinyl alcohol film of the invention, it is particularly preferred to be an aqueous solution obtained by dissolving the hydrous polyvinyl alcohol resin wet cake by introducing water vapor in the dissolution tank equipped with vertically circulating flow type mixing impellers in view of solubility.

Moreover, as a procedure other than the above one, using a multi-screw extruder, a polyvinyl alcohol resin wet cake after water removal or polyvinyl alcohol resin obtained by drying the cake may be charged thereinto and water, a plasticizer, and a surfactant may be charged by side feeding, followed by dissolution under heating and shearing.

At the dissolution of the above hydrous polyvinyl alcohol resin wet cake in the dissolution tank equipped with vertically circulating flow generation-type stirring blades, water vapor was introduced thereinto. At the time when water vapor is introduced, addition of water is also preferred so as to be a desired concentration. The amount of water vapor introduced is preferably in an amount of 0.5 to 5 times (in terms of weight) relative to the polyvinyl alcohol resin to be dissolved and the introduction time is preferably from 0.5 to 3 hours. When the introduced amount is less than 0.5 time, dissolution is insufficient. When the amount exceeds 5 times, a drained amount is too large and a desired concentration is not achieved. Thus, the cases are not preferred. Moreover, at the introduction of water vapor, it is preferably introduced from a can bottom but, without limitation thereto, it may be introduced from a side face or the like.

Furthermore, it is preferred to start stirring at the time when the resin temperature reaches preferably from 40 to 80° C., more preferably from 45 to 70° C. since homogeneous dissolution tank be achieved. When the resin temperature is less than 40° C., load on a motor becomes large. When the temperature exceeds 80° C., clumps of the polyvinyl alcohol resin may form and homogeneous stirring becomes impossible. Thus, the cases are not preferred.

In addition, it is also preferred to pressurize inside of the can at the time when the resin temperature reaches preferably from 90 to 100° C., further preferably from 95 to 100° C. by the introduction of water vapor since homogeneous dissolution tank be achieved. The resin temperature of less than 90° C. is not preferred because of formation of undissolved matter. At the time when the resin temperature reaches from 130 to 150° C., the introduction of water vapor is terminated and then the whole is continued to stir for 0.5 to 3 hours for achieving dissolution. After dissolution, the concentration is adjusted so as to obtain a desired concentration. The concentration of the aqueous solution is adjusted by sampling a portion of the solution in the can and measuring the concentration using a process refractometer (K-PATE, manufactured by NTS) under circulation.

The concentration of the aqueous polyvinyl alcohol resin solution thus obtained is preferably from 15 to 60 by weight, particularly preferably from 17 to 55% by weight, further preferably from 20 to 50% by weight. When the concentration is less than 15% by weight, a drying load becomes large and thus production capability is poor. When the concentration exceeds 60% by weight, the viscosity becomes too high to achieve homogeneous dissolution. Thus, the cases are not preferred.

Then, the aqueous polyvinyl alcohol resin solution obtained is subjected to a defoaming treatment. As the defoaming method, there may be mentioned methods of defoaming on standing, defoaming by means of a multi-screw extruder, and the like. The aqueous solution for use in the production of the polyvinyl alcohol film of the invention is preferably deformed using a multi-screw extruder. The multi-screw extruder is not particularly limited so far as it is a multi-screw extruder with bent but usually, a twin-screw extruder with bent is used.

The defoaming treatment using a multi-screw extruder is carried out with feeding the aqueous polyvinyl alcohol resin solution into the multi-screw extruder under conditions of a resin temperature at the bent part of preferably 105 to 180° C., further preferably 110 to 160° C. and an extruder head resin pressure of preferably 2 to 100 kg/cm², further preferably 5 to 70 kg/cm². When the resin temperature at the bent part is less than 105° C., defoaming is insufficient. When the temperature exceeds 180° C., resin degradation may occur. Moreover, when the extruder head resin pressure is less than 2 kg/cm², defoaming is insufficient. When the pressure exceeds 100 kg/cm², resin leakage at piping or the like may occur and thus stable production becomes impossible.

In addition, at the production of the polyvinyl alcohol film of the invention, in the case where a gear pump (P1) and a gear pump (P2) are provided before and after the multi-screw extruder, the aqueous polyvinyl alcohol resin solution is fed to the multi-screw extruder by the gear pump (P1), and the aqueous polyvinyl alcohol resin solution is discharged from the multi-screw extruder by means of the gear pump (P2), it is preferred to control the gear pump (P1) so that the inlet pressure of such a gear pump (P2) shows a constant value which falls within the range of preferably 2 to 70 kg/cm², further preferably 5 to 80 kg/cm² in view of improving accuracy of film thickness. When the inlet pressure is less than 2 kg/cm², defoaming becomes insufficient. When the pressure exceeds 70 kg/cm², the resin may leaked out of the bent part. Thus, the cases are not preferred. Moreover, even when the pressure falls within the above range, the accuracy of film thickness becomes insufficient unless the pressure does not show a constant value, so that the case is not preferred. In this connection, the constant value herein allows a range within ±2%, preferably within ±1.5% from a designated value.

After the defoaming treatment, the aqueous polyvinyl alcohol resin solution discharged from the multi-screw extruder is introduced into a T-form slit die a specific amount by a specific amount. Thereafter, the aqueous polyvinyl alcohol resin solution ejected from the slit die is cast on a drum roll or an endless belt and a film is formed and dried.

As the T-form slit die, an elongated rectangular T-form slit die is usually employed.

At the casting of the aqueous polyvinyl alcohol resin solution, a drum roll or an endless belt are commonly used but a drum roll is preferably used in view of widening and lengthening, uniformity of film thickness, and the like.

At the casting and film formation on the drum roll, for example, the rotation rate of the drum roll is preferably from 5 to 30 m/minute, particularly preferably from 6 to 20 m/minutes. The surface temperature of the drum roll is preferably from 70 to 99° C., more preferably from 75 to 97° C. When the surface temperature of the drum roll is less than 70° C., drying is insufficient. When the temperature exceeds 99° C., bubbles form in the film. Thus, the cases are not preferred. The resin temperature at the outlet of the T-form slit die is preferably from 80 to 100° C., more preferably from 85 to 98° C. When the resin temperature at the outlet of the T-form slit die is less than 80° C., flowability is insufficient. When the temperature exceeds 100° C., bubbles form. Thus, the cases are not preferred.

The size of the drum roll is not particularly limited but, for example, the diameter of the roll is preferably from 2000 to 4000 mm, more preferably from 2500 to 3800 mm.

The aqueous polyvinyl alcohol resin solution cast on the drum roll is subjected to film formation and subsequently to drying treatment to form a polyvinyl alcohol film. The surface temperature of a drying roll is not particularly limited but is preferably from 60 to 100° C., further preferably from 65 to 90° C. When the surface temperature is less than 60° C., drying is insufficient. When the temperature exceeds 100° C., the film is excessively dried and bad appearance may be invited. Thus, the cases are not preferred. After the drying, the film is subjected to thermal treatment, if necessary, and thereby a polyvinyl alcohol film is formed.

Alternatively, the polyvinyl alcohol film of the invention can be also obtained by the following production process.

Namely, the polyvinyl alcohol film of the invention is produced by casting an aqueous polyvinyl alcohol resin solution prepared using a polyvinyl alcohol resin to form a film, followed by drying. On this occasion, the film can be also obtained by the production process comprising a step of adding at least one nonionic surfactant to the polyvinyl alcohol resin so as to satisfy the following expression (1), preferably so as to satisfy the following expression (2), more preferably so as to satisfy the following expression (3):

$$0.5 \leq \Sigma\{(\text{HLB of nonionic surfactant}) \times (\text{Amount of nonionic surfactant to be added relative to polyvinyl alcohol resin (\% by weight)})\} \leq 2 \quad (1)$$

$$0.5 \leq \Sigma\{(\text{HLB of nonionic surfactant}) \times (\text{Amount of nonionic surfactant to be added relative to polyvinyl alcohol resin (\% by weight)})\} \leq 1.3 \quad (2)$$

$$0.5 \leq \Sigma\{(\text{HLB of nonionic surfactant}) \times (\text{Amount of nonionic surfactant to be added relative to polyvinyl alcohol resin (\% by weight)})\} \leq 1.2 \quad (3)$$

wherein HLB means a hydrophile lipidophile balance and Σ means sum of nonionic surfactants when two or more thereof are added.

When the compatibility of the nonionic surfactant with the aqueous polyvinyl alcohol resin solution is insufficient, the surfactant may precipitate inside the film and/or on the surface of the film during the process of film formation. In particular, since the aqueous polyvinyl alcohol resin solution is soluble in water, a nonionic surfactant is apt to precipitate although an anionic or cationic surfactant hardly precipitates. In order to avoid such precipitation, the nonionic surfactant to be added necessarily has an appropriate hydrophilic part.

The ratio of the hydrophilic part contained in the molecule of a surfactant is represented by a hydrophile lipidophile balance (hereinafter referred to as HLB) which is a quotient obtained by dividing an atomic group weight of the hydrophilic part by the molecular weight. In the present production process, the precipitation inside the film and on the surface can be avoided by selecting a nonionic surfactant having an appropriate HLB.

On the other hand, in order to avoid the precipitation of the surfactant, it is necessary to determine not only HLB of the surfactant but also an appropriate amount thereof to be added. This is because the degree of precipitation increases when the amount of the surfactant to be added is too large. Of course, when the amount of the surfactant to be added is too small, the intrinsic function of the surfactant is not exhibited. Namely, in the present production process, it is important for avoidance of the precipitation to add the nonionic surfactant so that a product obtained by multiplying HLB of the nonionic surfactant by the amount satisfies the above expression.

In the present production process, when $\leq \Sigma\{$(HLB of nonionic surfactant)×(Amount of nonionic surfactant to be added relative to polyvinyl alcohol resin (% by weight))$\}$ is less than 0.5, it is difficult to peel the polyvinyl alcohol film from a casting base material. When the value exceeds 2, precipitation of the surfactant occurs and thereby light transmittance of the film decreases. Thus, the cases are not preferred.

In the production process, HLB of the nonionic surfactant alone is preferably from 5 to 17, more preferably from 7 to 15, further preferably from 9 to 13. When HLB is less than 5, the compatibility with the aqueous polyvinyl alcohol resin solution is poor. When HLB exceeds 17, the peeling ability is insufficient. Thus, the cases are not preferred.

In the production process, the nonionic surfactant to be added may be one kind or two or more thereof may be used in combination. However, in order to assure peeling ability from a casting base material, sliding properties with the rolls during the steps, dyeing property in the production of a polarizing film, or attaching ability of a protective film of cellulose triacetate or the like, it is preferred to use two or more thereof in combination. In the production process, total amount of the nonionic surfactant(s) to be added is preferably from 0.01 to 0.5% by weight, more preferably from 0.02 to 0.3% by weight, further preferably from 0.04 to 0.2% by weight. When the amount is less than 0.01% by weight, the peeling ability is insufficient. When the amount exceeds 0.5% by weight, decrease in light transmittance induced by precipitation may occur. Thus, the cases are not preferred.

Moreover, in the production process, in order to assure peeling ability from a casting base material, sliding properties with the rolls during the steps, dyeing property in the production of a polarizing film, or attaching ability of a protective film of cellulose triacetate (TAC) or the like, it is important to use a nonionic surfactant but various surfactants such as anionic ones, cationic ones, and the like may be used in combination with the nonionic surfactant.

As a result, the polyvinyl alcohol film of the invention having a correlation length of 200 nm or less can be obtained.

The polyvinyl alcohol film of the invention can be obtained by the above-mentioned each production process. Also, a production process wherein the above production processes are combined may be employed.

The thickness of the polyvinyl alcohol film of the invention is preferably from 30 to 100 μm, more preferably from 30 to 70 μm, further preferably 35 to 65 μm, particularly preferably 40 to 60 μm. When the thickness is less than 30 μm, stretching is difficult and also sufficient polarizing performance is not obtained in the case where the film is used as a polarizing film. When the thickness exceeds 100 μm, accuracy in film formation decreases. Thus, the cases are not preferred.

Moreover, width and length of the polyvinyl alcohol film of the invention are not particularly limited but, in consideration of the trend of widening and lengthening in recent years, the width is preferably 2 m or more, more preferably 3 m or more, further preferably 3.3 m or more, particularly preferably 3.5 m or more. The length is preferably 1000 m or more, more preferably from 2000 m or more, further preferably 3000 m or more. In view of productivity of the polarizing film, the length is particularly preferably 4000 m or more. In this connection, an upper limit of the film length is usually 15000 m. When the width is less than 2 m or the length is less than 1000 m, productivity of the polarizing film is poor.

Light transmittance of the polyvinyl alcohol film of the invention is preferably 90% or more, more preferably 91% or more. An upper limit of the light transmittance is 95%.

Tensile strength of the polyvinyl alcohol film of the invention is preferably 70 N/mm$^2$ or more, more preferably 75 N/mm$^2$ or more. Moreover, an upper limit of the tensile strength is preferably 115 N/mm$^2$ or less, more preferably 110 N/mm$^2$ or less. In this connection, the tensile strength in the invention is tensile strength obtained by subjecting a test piece whose moisture is controlled under an environment of 20° C. and 65% RH to a tensile test at a tensile rate of 1000 mm/min under the same environment.

Complete dissolution temperature of the polyvinyl alcohol film of the invention is preferably 65° C. or higher, further preferably from 65 to 90° C., more preferably from 71 to 80° C. In this connection, the complete dissolution temperature in the invention is a temperature at which the film is completely dissolved at the time when 2000 ml of water is placed in a 2 L beaker and is elevated to a temperature of 30° C., then a film piece of 2 cm×2 cm is charged thereinto, and the water temperature is elevated at a rate of 3° C./minute under stirring. The thickness of the film piece is not particularly limited so far as it is from 30 to 70 μm.

The polyvinyl alcohol film of the invention is low in light scattering and has transparency and appearance sufficient as an optical film. Thus, the film is preferably used as a raw film for optical uses, particularly production of polarizing films.

The following will describe the process for producing the polarizing film of the invention using the polyvinyl alcohol film of the invention.

The polarizing film of the invention is produced via steps of usual dyeing, stretching, crosslinking with boric acid, and thermal treatment. As a process for producing the polarizing film, there are a method of stretching of the polyvinyl alcohol film, dyeing by dipping it in a solution of iodine or a dichroic dye, and subsequent treatment with a boron compound, a method of simultaneous stretching and dyeing and subsequent treatment with a boron compound, a method of dyeing with iodine or a dichroic dye, stretching, and subsequent treatment with a boron compound, a method of dyeing and subsequent stretching in a solution of a boron compound, and the like method, which can be suitably selected and used. Thus, the polyvinyl alcohol film (unstretched film) may be subjected to stretching, dyeing, and further treatment with a boron compound separately or simultaneously. However, in view of productivity, it is desirable to carry out uniaxial stretching during at least one step of the dyeing step and the step of treatment with a boron compound.

The stretching is desirably conducted at a magnification of preferably 3 to 10 times, further preferably 3.5 to 6 times in a uniaxial direction. On this occasion, it is also possible to slightly stretch in a direction perpendicular to the stretching direction (stretching of a degree so as to prevent shrinkage in a width direction or more degree). The temperature at stretching is desirably selected from 40 to 170° C. Furthermore, stretching magnification may be finally set within the above range and the stretching operation may be carried out not only at one stage but also at any stages in the production steps.

The dyeing of the film is generally carried out by bringing the film into contact with a liquid containing iodine or a dichroic dye. Usually, an aqueous solution of iodine-potassium iodide is used and it is preferable that concentration of iodine is from 0.1 to 20 g/L, concentration of potassium iodide is from 10 to 50 g/L, a weight ratio of potassium iodide/iodine is from 20 to 100. Dyeing time is practically from about 30 to 500 seconds. Temperature of the treating bath is preferably from 5 to 60° C. Into the aqueous solution, it is possible to incorporate an organic solvent compatible with water in addition to water solvent. As a means for the contact, any means such as dipping, applying, and spraying can be applied.

The film subjected to the dyeing treatment is generally treated with a boron compound. As the boron compound, boric acid or borax is practical. The boron compound is preferably used in a form of an aqueous solution or a mixed solution of water-organic solvent in a concentration of about 0.5 to 2 mol/L. In the solution, coexistence of a small amount of potassium iodide is practically desirable. A dipping method is desirable as the treating method but an applying method or a spraying method is also practicable. Temperature at the treatment is preferably about 50 to 70° C. and treating time is preferably from about 5 to 20 minutes. Moreover, if necessary, a stretching operation may be conducted during the treatment.

A polarization degree of the polarizing film of the invention thus obtained is preferably 99% or more, more preferably from 99.5% or more. When the polarization degree is less than 99%, there is a tendency that contrast of a liquid crystal display cannot be assured. In this connection, an upper limit of the polarization degree of the polarizing film is 100%.

Incidentally, the polarization degree is calculated according to the following expression from light transmittance ($H_{11}$) measured at a wavelength λ in a state that two polarizing films are overlaid so that orientation directions thereof are the same and light transmittance ($H_{1}$) measured at a wavelength λ in a state that two polarizing films are overlaid so that orientation directions thereof are orthogonal to each other.

$$[(H_{11}-H_{1})/(H_{11}+H_{1})]^{1/2}$$

Moreover, single transmittance of the polarizing film of the invention is preferably 43% or more, particularly preferably 44% or more. When the transmittance is less than 43%, there is a tendency that high luminance of a liquid crystal display cannot be achieved. In this connection, an upper limit of the single transmittance of the polarizing film is 46%.

The single transmittance is a value obtained by measuring light transmittance of a polarizing film itself using a spectrophotometer.

The polarizing film of the invention thus obtained can be used as a polarizing plate having a protective film on at least one surface thereof. The protective film is preferably an optically isotropic polymer film or polymer sheet. In the polarizing plate of the invention, as the protective film, there may be, for example, used a film or sheet of cellulose triacetate, cellulose diacetate, polycarbonate, polymethyl methacrylate, polystyrene, a polyether sulfone, a polyarylene ester, poly-4-methylpentene, polyphenylene oxide, a cyclo-type polyolefin, or a norbornene-based polyolefin, or the like.

Moreover, onto the polarizing film, for the purpose of thinning the film, instead of the above protective film, it is also possible to apply a curable resin such as a urethane-based resin, acrylic resin, or a urea resin on one surface or both surfaces thereof to effect lamination.

The polarizing film (inclusive of the film having a protective film or a curable resin laminated on at least one surface) is sometimes put into a practical use after formation of a transparent pressure-sensitive adhesive layer on one surface thereof, if necessary, by a method commonly known. As the pressure-sensitive adhesive layer, particularly preferred is one mainly comprising a copolymer of an acrylate ester such as butyl acrylate, ethyl acrylate, methyl acrylate, or 2-ethylhexyl acrylate with an α-monoolefinic carboxylic acid such as acrylic acid, maleic acid, itaconic acid, methacrylic acid, or crotonic acid (inclusive of a copolymer wherein a vinyl monomer such as acrylonitrile, vinyl acetate, or styrene is added) since polarizing properties of the polarizing film are not inhibited. However, any pressure-sensitive adhesive having transparency can be used without limitation thereto and polyvinyl ether-based one or rubber-based one may be used.

The polarizing film of the invention is preferably used in electronic desk calculators, electronic clocks or watches, word processors, personal computers, handy information terminals, liquid crystal display devices such as instruments for automobiles and machines, sunglasses, eye-protective glasses, 3D glasses, reflection-reducing layers for display devices (CRT, LCD, etc.), medical equipments, building materials, toys, and the like.

EXAMPLES

The following will specifically describe the invention with reference to Examples but the invention is not limited to these Examples unless it exceeds the gist. In Examples, "part(s)" and "%" mean "part(s) by weight" and "% by weight", respectively unless otherwise noted.

(1) Weight-Average Molecular Weight

It is measured under the following conditions by a GPC-LALLS method.

1) GPC

Apparatus: 244 type gel permeation chromatograph manufactured by Waters

Column: TSK-gel-GMPW$_{XL}$ manufactured by Tosoh Corporation (inner diameter of 8 mm, length of 30 cm, two columns)

Solvent: 0.1M Tris buffer solution (pH 7.9)

Flow rate: 0.5 ml/minute

Temperature: 23° C.

Sample concentration: 0.040%

Filtration: 0.45 μm MAISHORI disk W-25-5 manufactured by Tosoh Corporation

Injection amount: 0.2 ml

Detection sensitivity (differential refractometer detector): 4 magnifications

2) LALLS

Apparatus: KMX-6 type low angle laser light scattering photometer manufactured by Chromatrix Temperature: 23° C.

Wavelength: 633 nm

Second virial coefficient×concentration: 0 mol/g

Refractive index change (dn/dc): 0.159 ml/g

Change in refractive index with concentration: 0.159 ml/g

Filter: 0.45 μm filter HAWP01300 manufactured by MILLIPORE

Gain: 800 mV (2) Content of Higher Fatty Acid in Surfactant

It is measured using a high performance liquid chromatography-mass spectrometer (hereinafter referred to as LC-MASS) HP1100MSD manufactured by HEWLETT PACKARD. Detailed measuring conditions are as follows but the type of the equipment and measuring conditions are not limited thereto.

Column: YMC-Pack ODS-A 150×4.6 mm I.D. manufactured by K.K. YMC

Column temperature: 30° C.

Eluent: 0.1M aqueous ammonium acetate solution/methanol, gradient measurement (25/75→0/100 (15 minutes))

Flow rate: 0.7 ml/minute

Injection amount: 20 μL

MASS: electron spray ionization method, negative mode (3) Content of Higher Fatty Acid in Film A higher fatty acid is measured using the above LC-MASS after 6 hours of Soxhlet extraction from 1 g of a polyvinyl alcohol film using methanol as a solvent, concentration of the resulting extraction liquid to dryness on an evaporator, and subsequent adjustment to constant volume with methanol. Quantitative determination of each fatty acid is carried out by an absolute calibration method using a calibration curve prepared based on values obtained by similarly measurement of standard solutions prepared from individual higher fatty acid specimens having a purity of 99% or more on LC-MASS.

(4) Film-Forming Ability

At peeling a film from a drum roll, a film which cannot be peeled off due to adherence to the roll is evaluated as ×, a film which can be peeled off without troubles after a film having a length of 4000 m is formed is evaluated as ○, and a film showing no blocking after winding is evaluated ⊙.

(5) Light Scattering

A light scattering apparatus Dyna-3000 manufactured by Otsuka Electronics Co., Ltd. was used. A schematic view of the apparatus is shown in FIG. 1. A light detector is a CCD camera (512×512 ch) and Hv scattered light intensity induced by a polyvinyl alcohol film sample was measured as a one-dimensional data in an X-axis direction of CCD as shown by an arrow in FIG. 1. In this connection, the measurement was carried out under the following conditions with holding the film sample between sample plates, which are attachments of the apparatus, and placing the whole on a cell plate.

Measuring temperature: 23° C.

Light source: He—Ne laser (wavelength λ=633 nm)

Goniometer angle: 40°

Polarizer and Analyzer: 0° and 90°

ND filter before CCD=0.1%

CCD access pattern: (X) start1, end512, group4, (Y) start253, end259, group7 and one-dimensional measurement is set.

Then, "Debye plot" is selected on an analytic software attached to Dyna-3000 and a correlation length ξ is determined by subjecting scattered light intensity corrected on an attached software (background, ND filter, monitor light intensity, exposure time) to optimum fitting in the range of $q^2$ of 14.7 to 71.6 $\mu m^{-2}$ according to the following Debye-Bueche equation. In the data processing, 1.50 is used as a refractive index:

$$I=A/(1+\xi^2 q^2)^2$$

wherein I: corrected scattered light intensity, A: constant, ξ: correlation length, and q: wave number vector.

The wave number vector q is determined from a scattering angle $\theta(=\sin^{-1}[\sin(\theta)/n]$, θ is a scattering angle in the air) according to the following equation:

$$q=(4\pi n/\lambda)\times\sin(\theta s/2).$$

Incidentally, based on the above equation, the range of $q^2$=14.7 to 71.6 $\mu m^{-2}$ corresponds to the range of θ=22.5 to 54.8°.

Example 1

Production of Polyvinyl Alcohol Film

Water (200 kg) at 18° C. was placed in a 500 L tank and 40 kg of a polyvinyl alcohol resin having a weight-average molecular weight of 142000 and a saponification degree of 99.8% by mol was added-thereto, followed by stirring for 15 minutes. Then, after water was once discharged, 200 kg of water was further added and the whole was stirred for 15 minutes. The resulting slurry was subjected to water removal by means of a supper dacanter (manufactured by Tomoe Engineering Co., Ltd.), whereby a polyvinyl alcohol resin wet cake having a water content of 43% by weight was obtained.

The resulting polyvinyl alcohol resin wet cake (70 kg) was placed in a dissolution tank fitted with max blend-type blades, and 30 g of a higher fatty acid diethanolamide as a surfactant, 4.2 kg of glycerin as a plasticizer, and 10 kg of water were added thereto, followed by introduction of water vapor from the bottom of the can. Stirring (number of rotation: 5 rpm) was started at the time when inner resin temperature reached 50° C. and the inner system was pressurized at the time when inner resin temperature reached 100° C. After the temperature was elevated to 150° C., the introduction of water vapor was stopped (introduced amount of water vapor was 90 kg in total) and the whole was stirred for 30 minutes (number of rotation: 20 rpm). After homogeneously dissolved, an aqueous polyvinyl alcohol resin solution having a concentration of 27% was obtained through concentration adjustment.

The higher fatty acid diethanolamide used as a surfactant is a product produced starting from coconut oil. When components contained was analyzed on LC-MASS, lauric acid, myristic acid, palmitic acid, oleic acid, and stearic acid were observed and content of these higher fatty acids was found to be 7.6%.

Then, after the resulting aqueous polyvinyl alcohol resin solution (liquid temperature of 147° C.) was fed to a twin-screw extruder from the gear pump 1 and subjected to defoaming, the solution was discharged from the gear pump 2. The discharged aqueous polyvinyl alcohol resin solution was cast from a T-type slit die (straight manifold die) onto a drum roll to form a film. The casting/film formation conditions are as follows.

Drum Roll

Diameter (R1): 3200 mm, Width: 4000 mm, Rotation rate: 8 m/minute, Surface temperature: 90° C., Resin temperature at outlet of T-type slit die: 95° C.

When the film-forming ability was confirmed over a length of 4000 m, peeling ability of the film from the roll was good and the film-forming ability was satisfactory. Then, the front side and backside of the film were alternately dried with passing the film through drying rolls under the following conditions.

Drying Roll

Diameter (R2): 320 mm, Width: 4000 mm, Number of rolls (n): 10 rolls, Rotation rate: 8 m/minute, Surface temperature: 75° C.

Then, the film was subjected to a thermal treatment (condition: floating dryer (120° C., length of 6 m) and wound on a roll over a length of 4000 m. Thereafter, the film was again wound off from the roll but no blocking was observed and thus the film-forming ability was good. When the components contained in the resulting polyvinyl alcohol film (width of 3000 mm, length of 4000 m, thickness of 50 μm) were analyzed on LC-MASS, the content of higher fatty acids having 10 or more carbon atoms relative to the film was 56 ppm and the ratio of the content of higher fatty acids having 14 or more carbon atoms relative to the content of higher fatty acids having 10 or more carbon atoms was 32%. Moreover, a correlation length determined by light scattering measurement was 185 nm.

(Production of Polarizing Film)

The resulting polyvinyl alcohol film was dipped in an aqueous solution composed of 0.2 g/L of iodine and 15 g/L of potassium iodide at 30° C. for 240 seconds and then was dipped in an aqueous solution (55° C.) having a composition of 60 g/L of boric acid and 30 g/L of potassium iodide to perform treatment with boric acid over a period of 5 minutes with simultaneous uniaxial stretching of 5.5 magnifications. Thereafter, the film was dried to obtain a polarizing film. Polarizing degree and single transmittance of the resulting polarizing film were measured using a Multi Channel Retardation Measuring System (RETS-2000 manufactured by Otsuka Electronics Co., Ltd.; wavelength: 550 nm). The measurement results are shown in Table 1.

Examples 2 to 5

Polyvinyl alcohol films and polarizing films were obtained in the same manner as in Example 1 with the exception of the conditions shown in Table 1 (in example 5, the concentration of the aqueous polyvinyl alcohol resin solution was 25%). The light scattering correlation length and film-forming ability of the polyvinyl alcohol films and the polarization degree and light transmittance of the polarizing films are shown in Table 1.

Comparative Examples 1 and 2

Polyvinyl alcohol films and polarizing films were obtained in the same manner as in Example 1 with the exception of the conditions shown in Table 1. The light scattering correlation length and film-forming ability of the polyvinyl alcohol films and the polarization degree and light transmittance of the polarizing films are shown in Table 1.

TABLE 1

| | Weight-average molecular weight of polyvinyl alcohol resin | Surfactant (g) | Content of higher fatty acid having 10 or more carbon atoms in surfactant (% by weight) | Content of higher fatty acid having 10 or more carbon atoms in film (ppm) |
|---|---|---|---|---|
| Example 1 | 142000 | higher fatty acid diethanolamide starting with coconut oil 30 | 7.6 | 56 |
| Example 2 | 142000 | lauric acid diethanolamide 15 higher fatty acid diethanolamide starting with coconut oil 15 | 6.0 | 29 |
| Example 3 | 142000 | higher fatty acid diethanolamide starting with coconut oil 21 | 7.6 | 28 |
| Example 4 | 142000 | lauric acid diethanolamide 21 | 4.3 | 17 |
| Example 5 | 165000 | higher fatty acid diethanolamide starting with coconut oil 21 | 7.6 | 26 |
| Comparative Example 1 | 142000 | higher fatty acid diethanolamide starting with coconut oil 60 | 7.6 | 109 |
| Comparative Example 2 | 142000 | higher fatty acid diethanolamide starting with beef tallow 30 | 8.5 | 67 |

| | Ratio of content of higher fatty acid having 14 or more carbon atoms relative to content of higher fatty acid having 10 or more carbon atoms (% by weight) | Correlation length of light scattering (nm) | Film-forming ability | Polarization degree (%) | Light transmittance (%) |
|---|---|---|---|---|---|
| Example 1 | 32 | 185 | ⊚ | 99.9 | 43.8 |
| Example 2 | 14 | 135 | ⊚ | 99.9 | 44.1 |
| Example 3 | 24 | 149 | ⊚ | 99.9 | 43.9 |
| Example 4 | (*) | 120 | ○ | 99.9 | 44.2 |
| Example 5 | 22 | 142 | ⊚ | 99.9 | 44.1 |
| Comparative Example 1 | 38 | 301 | ⊚ | 99.8 | 42.6 |
| Comparative Example 2 | 96 | 370 | ⊚ | 99.8 | 42.6 |

(*): lower than analytical limit

While the invention has been described in detail and with reference to specific embodiments thereof, it will be apparent to one skilled in the art that various changes and modifications can be made therein without departing from the spirit and scope thereof.

The present application is based on Japanese Patent Application No. 2004-381184 filed on Dec. 28, 2004, and the contents are incorporated herein by reference.

INDUSTRIAL APPLICABILITY

According to the present invention, there can be obtained a polyvinyl alcohol film capable of being used as a raw film at the production of a polarizing film which is excellent in film-forming ability, exhibits little light scattering, and excellent in light transmittance. Moreover, a polarizing film obtained from the polyvinyl alcohol film of the invention can meet fineness enhancement, luminance enhancement, and area enlargement of liquid crystal displays.

The invention claimed is:

1. A polyvinyl alcohol film comprising a polyvinyl alcohol-based resin saponified at 99 to 100% by mol, which has a correlation length of 200 nm or less, in which the correlation length is derived from the result of light scattering measurement using a He—Ne laser having a wavelength of 633 nm as a light source, a content of fatty acid having 14 or more carbon atoms present in the film is from 0.1 to 40% by weight relative to the content of fatty acids having 10 or more carbon atoms, and a complete dissolution temperature of 65° or higher.

2. The polyvinyl alcohol film according to claim 1, wherein a content of fatty acid having 10 or more carbon atoms present in the film is from 1 to 100 ppm.

3. The polyvinyl alcohol film according to claim 2, wherein the fatty acid having 10 or more carbon atoms include lauric acid.

4. The polyvinyl alcohol film according to claim 2, which contains a surfactant containing fatty acid having 10 or more carbon atoms in an amount of 1 to 10% by weight.

5. The polyvinyl alcohol film according to claim 1, which contains a polyvinyl alcohol resin having a weight-average molecular weight of 140,000 to 260,000.

6. The polyvinyl alcohol film according to claim 1, which has a film thickness of from 30 to 70 μm.

7. The polyvinyl alcohol film according to claim 1, which has a film width of 3 m or more.

8. The polyvinyl alcohol film according to claim 1, which has a film length of 4000 m or more.

9. A polarizing film formed from the polyvinyl alcohol film according to claim 1.

10. A polarizing plate comprising the polarizing film according to claim 9 and a protective film provided on at least one surface of the above polarizing film.

* * * * *